July 21, 1925.
W. E. WUELKER
1,546,529
OIL AND POLISH APPLIER
Filed March 7, 1923
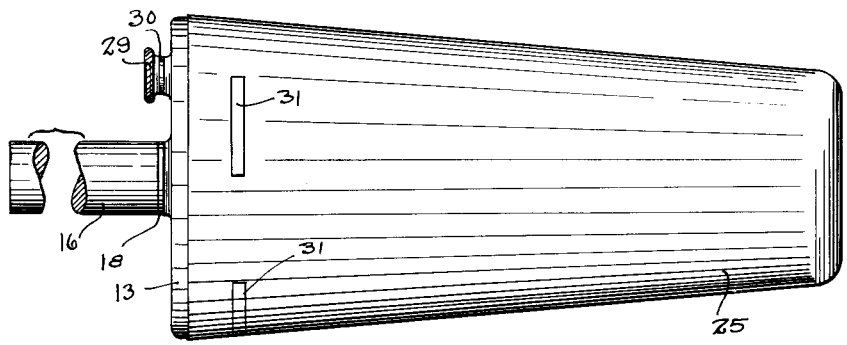
Fig. 1
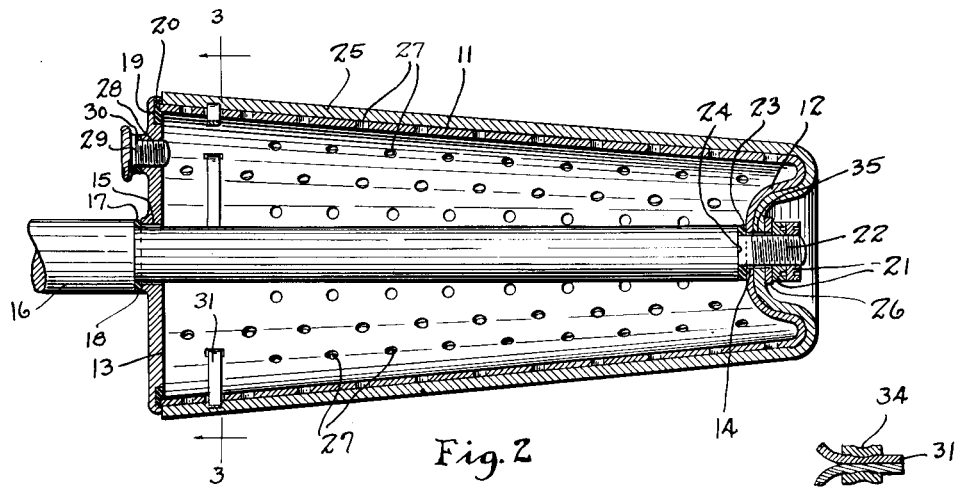
Fig. 2
Fig. 5
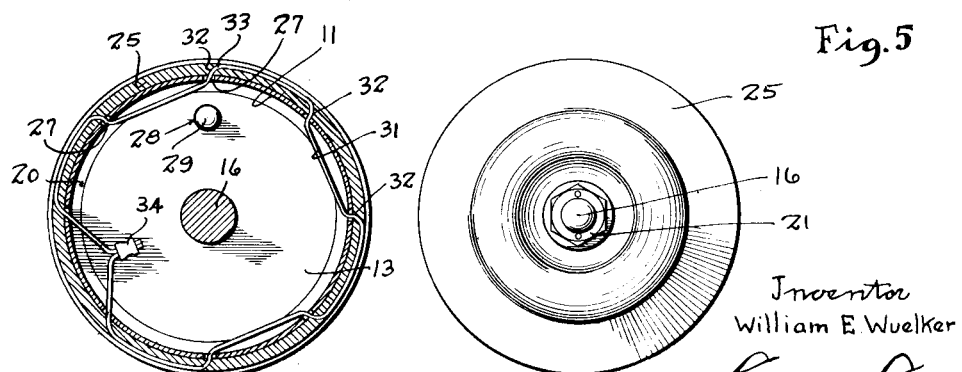
Fig. 3
Fig. 4
Inventor
William E. Wuelker
By Lyon & Lyon
attys.

Patented July 21, 1925.

1,546,529

UNITED STATES PATENT OFFICE.

WILLIAM E. WUELKER, OF LOS ANGELES, CALIFORNIA.

OIL AND POLISH APPLIER.

Application filed March 7, 1923. Serial No. 623,447.

*To all whom it may concern:*

Be it known that I, WILLIAM E. WUELKER, a citizen of the United States, residing at Los Angeles, in the county of Los Angeles and State of California, have invented a new and useful Oil and Polish Applier, of which the following is a specification.

This invention relates to means for conviently applying oil and polish to a surface that is to be polished.

An object of the invention is to make provision for supplying an oil or polish to a brushing member from the interior of said member, while the applier is in use.

Another object is to guard against scratching the surface undergoing treatment.

Another object is to secure the fabric polishing cap in place on the polish-holding cylinder without the use of metallic parts at the periphery of the applier, thus insuring against scratching of the surface on which the appliei is used.

Though the applier may be operated by any suitable means, it is especially useful as a part of the apparatus disclosed in my copending application for patent, Serial No. 623,449, filed March 7, 1923.

The accompaning drawings illustrate the invention:

Figure 1 is a longitudinal view of an oil and polish applier constructed in accordance with the provisions of this invention, a portion of the stem being broken away to contract the view.

Fig. 2 is a longitudinal mid section of Figure 1.

Fig. 3 is a transverse section on the line indicated by 3—3, Figure 2.

Fig. 4 is an end view of Figure 2 from the right thereof.

Fig. 5 is a sectional detail showing the end portions of the lacing and the clip for connecting together said end portions.

Referring to the drawings, there is provided a frusto-conical cylinder 11 having an integral head 12 at one end and a detachable head 13 at the other end to form a polish container. The heads 12, 13 are provided with axial openings 14, 15, respectively, to accommodate a stem 16. The stem 16 is provided with a shoulder 17 against which seats a gasket 18. The outer face of the head 13 seats against the gasket 18, thus making a tight joint between the head 13 and the stem 16. The head 13 is provided with an annular groove 19 near its margin, in which is seated an annular gasket 20. The larger end of the cylinder 11 seats against the gasket 20, thus making a tight joint between the cylinder and the head 13.

The cylinder 11 is held securely against the gasket 20 by a nut or nuts 21 on a threaded portion 22 of the stem 16, said threaded portion projecting beyond the outer face of the head 12. The head 12 is recessed or cupped and can be sprung slightly, if necessary, by tightening the nuts 21 so as to not only hold the cylinder against the gasket 20 but to also compress a gasket 23 between the inner face of the head 12 and a shoulder 24 on the stem 16, thus to prevent escape of liquids or semi-solids from the interior of the cylinder through the opening 14.

Fitting the outer face of the head 12 and the periphery of the cylinder 11 is a tapered fabric cap 25 of felt or other material suitable for applying oils and polishes to the surface that is to be treated. The stem 16 projects through a hole 35 in the cap 25 and the cap portion adjacent to the hole is interposed between the head 12 and nuts 21 and, in this instance, the innermost nut 21 bears against a washer 26 that in turn seats against the cap 25.

The cylinder 11 is provided with any desired number of perforations 27 to permit of the passage of liquid or semi-solid polish from the interior of the cylinder to the inner face of the cap 25, so that said cap can absorb said polish. The liquid or semi-solid oil or polish that is employed in the cylinder may be injected thereinto through a port 28 in the head 13, said port being normally closed by a plug 29, screw-threaded into the port. If desired, the joint between the plug 29 and head 13 may be made leak proof by a gasket 30 surrounding the plug.

The nuts 21 hold the one end of the cap 26 in place, and means are provided to hold the other end of said cap firmly in place on the periphery of the cylinder 11. In this instance, such means are constructed as follows:

Though certain of the perforations 27 is laced in and out a lacing or thong 31 of leather or other suitable material, said lacing also passing through holes 32 in the cap 25. The holes 32 are arranged in pairs, one at each end of a recess 33 in the outer face of the cap 25 so that all portions of the lacings 31 lie inwardly from the periphery of the cap 25, in order that when the applier is being used the lacing cannot rub upon the surface being treated.

The opposite ends of the lacing 31 are brought together inside of the cylinder and fastened together by any suitable means. In this particular instance, the end portions are clamped together by a metal clip 34 which is crimped upon said end portions, as clearly shown in Figure 5.

To use the applier, an oil or polish will be charged into the cylinder through the opening 28 and the applier will then be manipulated upon the surface to be treated. Though the manipulation may be effected by hand or any suitable apparatus, I have especially constructed the applier so that it may be used as a brush in the apparatus disclosed in the above mentioned copending application. When used with such apparatus, or one of similar character, the stem 16 will be clamped in the chuck of said apparatus and upon operation of the apparatus the cylinder and cap 25 will be caused to rotate. Centrifugal force produced by rotation of the body of oil or polish within the cylinder causes said oil or polish to exude through the perforations 27 into the cap 25 and to pass through said cap to the outer face thereof. Then, as the rotating cap is passed over the surface being treated, the oil or polish, which has passed to the outer face of the cap, will be distributed evenly over said surface.

I claim:

1. In an oil and polish applier, the combination of a perforated cylinder provided with heads at its opposite ends, a fabric cap fitting over the cylinder and one of the heads, means to secure the cap in place, and a stem connected with one of the heads and passing through the other head.

2. In an oil and polish applier, the combination of a perforated cylinder having a cupped head at one end, a fabric cap fitting over the head and periphery of the cylinder, a head for the other end of the cylinder, a stem extending through both heads, a nut threaded onto the stem to hold the cap against the first head, and means securing the cap to the cylinder.

3. In an oil and polish applier, the combination of a frusto conical cylinder having perforations in its peripheral wall and provided with heads at its opposite ends, a tapered fabric cap fitting the periphery of the cylinder and the outer face of one of the heads, and a stem connected with one of the heads and passing through the other head.

Signed at Los Angeles, Calif., this 23d day of February, 1923.

WILLIAM E. WUELKER.